(12) United States Patent
Khoshnevis

(10) Patent No.: US 8,568,121 B2
(45) Date of Patent: Oct. 29, 2013

(54) TECHNIQUES FOR SENSING MATERIAL FLOW RATE IN AUTOMATED EXTRUSION

(75) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 12/277,176

(22) Filed: Nov. 24, 2008

(65) Prior Publication Data

US 2009/0134539 A1    May 28, 2009

Related U.S. Application Data

(60) Provisional application No. 60/990,581, filed on Nov. 27, 2007.

(51) Int. Cl.
  *B29C 47/96*    (2006.01)
(52) U.S. Cl.
  USPC .............................. 425/145; 264/40.7; 425/63
(58) Field of Classification Search
  USPC .................................... 264/40.7; 425/63, 145
  See application file for complete search history.

(56) References Cited

U.S. PATENT DOCUMENTS

| | | | |
|---|---|---|---|
| 984,517 A | 2/1911 | Rollinger | |
| 1,578,511 A | 3/1926 | Gladwin | |
| 1,920,716 A | 8/1933 | Schafer | |
| 2,877,530 A | 3/1959 | Winn, Jr. | |
| 3,221,457 A | 12/1965 | Vevoda | |
| 3,358,325 A | 12/1967 | Chisholm | |
| 3,372,430 A | 3/1968 | Lowes | |
| 3,376,602 A | 4/1968 | Lowes | |
| 3,417,429 A | 12/1968 | Wright | |
| 3,562,991 A | 2/1971 | Kustusch | |
| 3,897,298 A | 7/1975 | Gray | |
| 3,922,125 A | 11/1975 | Christensen | |
| 3,966,533 A | 6/1976 | Goldsworthy et al. | |
| 4,041,756 A | 8/1977 | Head et al. | |
| 4,066,723 A | 1/1978 | King et al. | |
| 4,517,780 A | 5/1985 | Lacombe et al. | |
| 4,606,169 A | 8/1986 | Noon et al. | |
| 4,789,507 A | 12/1988 | Wesley et al. | |
| 4,833,855 A | 5/1989 | Winter, IV | |
| 4,850,382 A | 7/1989 | Williams | |

(Continued)

FOREIGN PATENT DOCUMENTS

| JP | 03-256705 A1 | 11/1991 |
|---|---|---|
| JP | 2004036123 A * | 2/2004 |

OTHER PUBLICATIONS

International Search Report for PCT Application Serial No. PCT/US06/046910, mailed on Feb. 1, 2008.

(Continued)

*Primary Examiner* — Amjad Abraham
(74) *Attorney, Agent, or Firm* — McDermott Will & Emery LLP

(57) ABSTRACT

An extrusion construction system may include an extrusion nozzle configured to extrude construction material through an outlet onto an external surface, the extrusion nozzle including an excess flow port disposed substantially adjacent an edge of the outlet, an imaging device coupled to the extrusion nozzle, and a controller configured to adjust the rate of material flow through the extrusion nozzle in response to receiving one or more images captured by the imaging device showing excess material being extruded through the excess flow port.

16 Claims, 6 Drawing Sheets

(56) References Cited

U.S. PATENT DOCUMENTS

| | | | |
|---|---|---|---|
| 4,922,338 A * | 5/1990 | Arpino | 348/125 |
| 5,059,266 A | 10/1991 | Yamane et al. | |
| 5,248,341 A | 9/1993 | Berry, Jr. et al. | |
| 5,303,141 A | 4/1994 | Batchelder et al. | |
| 5,357,784 A | 10/1994 | Collier | |
| 5,402,351 A * | 3/1995 | Batchelder et al. | 700/119 |
| 5,529,471 A | 6/1996 | Khoshnevis | |
| 5,617,515 A | 4/1997 | MacLaren et al. | |
| 5,656,230 A | 8/1997 | Khoshnevis | |
| 5,664,382 A | 9/1997 | Melnick et al. | |
| 5,749,196 A | 5/1998 | Bangma | |
| 5,932,062 A * | 8/1999 | Manser | 156/357 |
| 6,001,181 A | 12/1999 | Bullen | |
| 6,103,161 A | 8/2000 | Lopez | |
| 6,170,220 B1 | 1/2001 | Moore, Jr. | |
| 6,363,683 B1 | 4/2002 | Moore, Jr. | |
| 6,423,261 B1 | 7/2002 | Joseph et al. | |
| 6,475,282 B1 * | 11/2002 | Snodgrass et al. | 118/663 |
| 6,645,406 B1 | 11/2003 | Slyne | |
| 6,652,014 B2 | 11/2003 | Schmalz et al. | |
| 6,662,516 B2 | 12/2003 | Vandehey et al. | |
| 7,126,489 B2 | 10/2006 | Tubb et al. | |
| 7,153,454 B2 | 12/2006 | Khoshnevis | |
| 7,236,166 B2 | 6/2007 | Zinniel et al. | |
| 7,369,230 B1 | 5/2008 | Rogers | |
| 7,452,196 B2 | 11/2008 | Khoshnevis | |
| 2004/0164436 A1 * | 8/2004 | Khoshnevis | 264/31 |
| 2005/0044700 A1 | 3/2005 | Ghuman et al. | |
| 2005/0194401 A1 * | 9/2005 | Khoshnevis | 222/100 |
| 2005/0196482 A1 | 9/2005 | Khoshevis | |
| 2005/0196484 A1 | 9/2005 | Khoshevis | |
| 2006/0163778 A1 | 7/2006 | Maziers et al. | |
| 2007/0092407 A1 | 4/2007 | Xiao et al. | |
| 2007/0138678 A1 | 6/2007 | Khoshevis | |
| 2007/0138687 A1 | 6/2007 | Khoshevis | |
| 2007/0148006 A1 | 6/2007 | Khoshevis | |
| 2007/0178607 A1 | 8/2007 | Prober et al. | |
| 2007/0181519 A1 | 8/2007 | Khoshevis | |
| 2007/0286674 A1 | 12/2007 | Khoshevis | |
| 2008/0017663 A1 | 1/2008 | Khoshevis | |
| 2008/0121013 A1 | 5/2008 | Khoshevis | |
| 2009/0134540 A1 | 5/2009 | Khoshnevis | |

OTHER PUBLICATIONS

Kwon, H. Experimentation and Analysis of Contour Crafting (CC) Process Using Uncured Ceramic Materials. University of Southern California Ph. D. Dissertation [online], Aug. 2002, p. i-xiv, 1-198 [retrieved Jan. 8, 2009] Retrieved from the Internet: <URL:http://homepage.mac.com/alborz/CC_page/images/HK-Thesis.pdf>.

Lane, T. A Giant Leap for a Brickie. Building [online], Jul. 16, 2004, p. 38-42 [retrieved Jan. 8, 2009] Retrieved from the Internet: <URL:http://craft.usc.edu/CC/Welcome_files/resources/media/building.pdf>.

Office Action (non-final), dated Oct. 27, 2009, for U.S. Appl. No. 12/277,181, filed Nov. 24, 2008, published as U.S. 2009/0134540 A1, May 28, 2009, entitled "Techniques for Sensing Material Flow Rate in Automated Extrusion."

Office Action (final), dated Jun. 25, 2010, for U.S. Appl. No. 12/277,181, filed Nov. 24, 2008, published as U.S. 2009/0134540 A1, May 28, 2009, entitled "Techniques for Sensing Material Flow Rate in Automated Extrusion."

Advisory Action, dated Oct. 4, 2010, for U.S. Appl. No. 12/277,181, filed Nov. 24, 2008, published as U.S. 2009/0134540 A1, May 28, 2009, entitled "Techniques for Sensing Material Flow Rate in Automated Extrusion."

Office Action (non-final), dated Jul. 19, 2012, for U.S. Appl. No. 12/277,181, filed Nov. 24, 2008, published as U.S. 2009/0134540 A1, May 28, 2009, entitled "Techniques for Sensing Material Flow Rate in Automated Extrusion."

* cited by examiner

TECHNIQUES FOR SENSING MATERIAL FLOW RATE IN AUTOMATED EXTRUSION

CROSS-REFERENCE TO RELATED APPLICATION(S)

This application is based upon and claims priority to U.S. Provisional Patent Application Ser. No. 60/990,581, entitled "Methods for Sensing Viscous Fluid Flow Rate," filed Nov. 27, 2007. The entire content of this application is incorporated herein by reference.

This application is related to the following:

U.S. patent application Ser. No. 11/040,401, entitled "Robotic Systems for Automated Construction," filed Jan. 21, 2005; which claims priority to U.S. Provisional Application Ser. No. 60/537,756, entitled "Automated Construction Using Extrusion," filed Jan. 20, 2004;

U.S. patent application Ser. No. 11/040,602, entitled "Automated Plumbing, Wiring, and Reinforcement," filed Jan. 21, 2005; which claims priority to U.S. Provisional Application Ser. No. 60/537,756, entitled "Automated Construction Using Extrusion," filed Jan. 20, 2004;

U.S. patent application Ser. No. 11/040,518, entitled "Mixer-Extruder Assembly," filed Jan. 21, 2005; which claims priority to U.S. Provisional Application Ser. No. 60/537,756, entitled "Automated Construction Using Extrusion," filed Jan. 20, 2004;

U.S. patent application Ser. No. 11/552,885, entitled "Extruded Wall with Rib-Like Interior," filed Oct. 25, 2006; which claims priority to U.S. Provisional Application No. 60/730,560, entitled "Contour Crafting Nozzle and Features for Fabrication of Hollow Structures," filed Oct. 26, 2005;

U.S. patent application Ser. No. 11/552,741, entitled "Deployable Contour Crafting," filed Oct. 25, 2006; which claims priority to U.S. Provisional Application No. 60/730,418, entitled "Deployable Contour Crafting Machine," filed Oct. 26, 2005;

U.S. patent application Ser. No. 11/556,027, entitled "Material Delivery System Using Decoupling Accumulator," filed Nov. 2, 2006; which claims priority to U.S. Provisional Application No. 60/733,451, entitled "Material Delivery Approaches for Contour Crafting," filed Nov. 4, 2005;

U.S. patent application Ser. No. 11/556,048, entitled "Dry Material Transport and Extrusion," filed Nov. 2, 2006; which claims priority to U.S. Provisional Application No. 60/733,451, entitled "Material Delivery Approaches for Contour Crafting," filed Nov. 4, 2005;

U.S. patent application Ser. No. 11/733,096, entitled "Compliant, Low Profile, Independently Releasing, Non-Protruding and Genderless Docking System for Robotic Modules," filed Apr. 9, 2007; which claims priority to U.S. Provisional Application No. 60/744,483, "Compliant, Low Profile, Non-Protruding, and Genderless Docking System for Robotic Modules," filed Apr. 7, 2006, matter no. 28080-202;

U.S. patent application Ser. No. 11/780,978, entitled "Bag Lifting and Emptying System," filed Jul. 20, 2007; which claims priority to U.S. Provisional Application No. 60/807,867, entitled "Lifting and Emptying System for Bagged Materials," filed Jul. 20, 2007;

U.S. patent application Ser. No. 11/934,507, entitled "Gantry Robotics System and Related Material Transport for Contour Crafting," filed Nov. 2, 2007; which claims priority to U.S. Provisional Application No. 60/864,293, entitled "Gantry Robotics System and Related Material Transport for Contour Crafting," filed Nov. 3, 2006; and U.S. patent application Ser. No. 11/933,985, entitled "Metering and Pumping Devices," filed Nov. 1, 2007; which claims priority to U.S. Provisional Application No. 60/864,060, entitled "Metering and Pumping Devices," filed Nov. 3, 2006.

PCT Application No. PCT/US08/80976, entitled "Contour Crafting Extrusion Nozzles" filed Oct. 23, 2008, which is based upon and claims priority to U.S. Provisional Patent Application Ser. No. 60/982,378, entitled "Nozzles for Contour Crafting of Walls," filed Oct. 24, 2007; and U.S. Provisional Patent Application Ser. No. 60/990,581, filed Nov. 27, 2007, entitled "Methods for Sensing Viscous Fluid Flow Rate,".

U.S. Provisional Application No. 61/113,148, entitled "Metering Device for Flow Control of Abrasive Viscous Fluids," filed Nov. 10, 2008.

U.S. Pat. No. 7,153,454, entitled "Multi-Nozzle Assembly for Extrusion of Wall," issued Dec. 26, 2006.

The entire content of all of the aforementioned patent applications and patent is incorporated herein by reference.

STATEMENT REGARDING FEDERALLY SPONSORED RESEARCH

This invention was made with government support under Contract No. N00014-05-1-0850 awarded by the Office of Naval Research. The government has certain rights in the invention.

BACKGROUND

1. Field

This disclosure relates to construction of structures, such as walls and buildings. This disclosure also relates to extrusion of construction material and devices and apparatus that are involved in such a process, including extrusion nozzles.

2. Description of Related Art

Constructing homes, offices, and other structures has an ancient heritage. Despite centuries of development, however, construction can still be very labor intensive. Even a modest sized structure may require the efforts of numerous workers. The appearance and quality of several structures built from the same design may also vary due to differences in the skills, efforts, supervision, and techniques employed by their builders. Construction may also waste material. When standard off-the-shelf lengths of wood is used, for example, the wood may have to be cut to meet design requirements. Construction may also be hazardous. Construction workers may be killed or seriously injured.

These problems gave rise to the nozzle assemblies disclosed in U.S. Pat. No. 7,153,454, issued Dec. 26, 2006, entitled "Multi-Nozzle Assembly for Extrusion of Wall," as well as the related equipment and methods disclosed in the patent applications cited above.

These patent applications and patent collectively disclose equipment and methods for automatically constructing buildings by extruding construction material, layer by layer, from one or more extrusion nozzles. These nozzles may be manipulated by robots under computer control. The process has become known as "Contour Crafting."

Such advancements have brought with them corresponding challenges. For example, it may be challenging to extrude walls which have multiple layers, such as an internal core of insulation, a stucco exterior, and a plastered interior. It may also be challenging to craft openings in such extruded walls for such components as windows and doors. It may also be challenging to create a uniform and level base layer when the underlying surface is uneven.

One particular challenge relates to controlling the flow of material extruded from a nozzle as it forms a layer. Flow rate is generally a parameter that must be regulated in a variety of situations. One example includes a situation where a substantially homogenous layer of material is to be extruded. If, when the layer is constructed, the material flow rate changes substantially, the layer will likely vary in size and shape. The potential variance may introduce unwanted hazards, weaknesses and defects and present unwanted aesthetic artifacts, and it may result in structures that are not consistent with their originally issued specifications.

Several flow measurement techniques have been proposed or implemented to address this problem. However, for certain fluids and materials these methods are either unworkable or they are too slow in providing an accurate response, particularly in automated extrusion processes.

SUMMARY

An extrusion construction system may include an extrusion nozzle configured to extrude construction material through an outlet onto an external surface, the extrusion nozzle including an excess flow port disposed substantially adjacent an edge of the outlet, an imaging device coupled to the extrusion nozzle, and a controller configured to adjust the rate of material flow through the extrusion nozzle in response to receiving one or more images captured by the imaging device showing excess material being extruded through the excess flow port.

The extrusion construction system include an extrusion nozzle configured to extrude construction material through an outlet onto an external surface, the extrusion nozzle comprising an excess flow port adjacent the outlet, an imaging device coupled to the extrusion nozzle, and a controller configured to adjust the rate of material flow through the extrusion nozzle in response to receiving at least one image captured by the imaging device showing excess material being extruded through the excess flow port while the extrusion nozzle is in operation.

The extrusion construction system may include extrusion nozzle means including an outlet for extruding construction material through the outlet to form a substantially horizontal extruded layer, illumination means for illuminating an excess flow port, imaging means for capturing images of excess material flow through the excess flow port, and controller means for reducing the material flow rate through the extrusion nozzle means in response to receiving captured images of the excess material flow.

The extrusion nozzle may include an illumination unit configured to illuminate the excess flow port for the capturing by the imaging device of the one or more images of the excess material being extruded.

The extrusion nozzle may be coupled to a mirror disposed substantially adjacent and to a side of the excess flow port, a surface of the mirror being positioned at an angle greater than zero degrees and less than ninety degrees relative to a surface upon which the extrusion nozzle is configured to extrude construction material, wherein the imaging device is further configured to capture images of a reflection of the mirror showing the excess material being extruded, and wherein the one or more captured images received by the controller comprise at least one said image of the excess material without use of the mirror and at least one said image using the mirror.

The views of the excess material with the mirror and without the mirror may be taken in the same frame, and separated by the controller. Alternatively, they may be taken in different frames.

A process for regulating the flow rate of material through an extrusion nozzle may include extruding construction material through an outlet of an extrusion nozzle onto an external surface, the extrusion nozzle including an excess flow port disposed substantially adjacent one or more edges of the outlet, capturing, by an imaging device coupled to the extrusion nozzle, one or more images showing excess material being extruded through the excess flow port, and adjusting the rate of material flow through the extrusion nozzle in response to receiving the one or more images.

The process may include illuminating, using an illumination unit coupled to the extrusion nozzle, the excess flow port for the capturing by the imaging device of the one or more images of the excess material being extruded.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

FIG. 4b illustrates an alternative view of the extrusion nozzle assembly of FIG. 4a.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
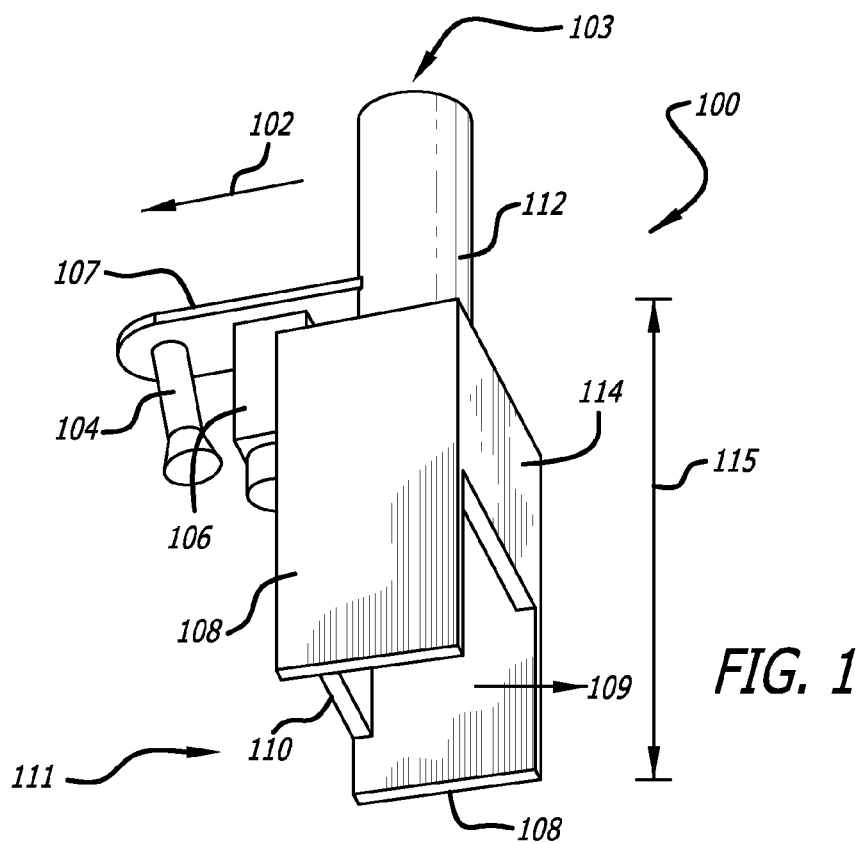
FIG. 1 illustrates a perspective view of an extrusion nozzle assembly configured to detect excess outflow in a direction parallel to the direction of nozzle motion.

In some aspects, the nozzle assembly includes an imaging device for sensing the amount of excess material flow through the nozzle. Using information from the captured images, a controller may thereby adjust the material flow rate through the nozzle as necessary. FIG. 1 illustrates an extrusion nozzle assembly configured to extrude a layer of material and to detect excess outflow in a direction parallel to the direction of nozzle motion. An extrusion nozzle 100 may include an inlet 103, a tube 112, a housing 115 which has an outlet 109, side walls 108, a front wall 110, and a rear wall 114.

Construction material, such as cementitious material, concrete, foam, plaster, stucco, may be delivered in a viscous fluidic state into the inlet 103. This material may then be extruded through the outlet 109. In alternative embodiments side trowels and/or channel protrusions may also be present in housing 115 may be attached to side walls 108 to shape the flow of extruding material as it exits the nozzle. The arrow 102 demonstrates the direction of movement of the extrusion nozzle assembly 102 as material moves in through inlet 103 and out through outlet 109.

Coupled to tube 112 is a connector arm 107 which extends substantially over the front wall 110. In one embodiment, planer element 107 may be configured to rotate along an axis perpendicular to itself and parallel to tube 112. Connector arm 107 may thereupon be fixed in different positions as appropriate. Coupled to the undersurface of connector arm 107 is a digital imaging device 106, such as a digital camera, as well as an illumination unit 104. The digital imaging device 106 may constitute, for example, a CCD or a CMOS camera, or any such device capable of taking successive still images of an object to be viewed, video footage, and the like. The illumination unit 104 is a light source configured to provide, by its positioning on connector arm 107, illumination in the direction in which the imaging device 106 is pointing.

Front wall 110 is shorter than side walls 108. This length difference defines a gap 111 at the bottom of front wall 110. The gap 111 is defined by the bottom edge of front wall 110 and by portions of the side edges 108. An excess flow port is defined by the top and side walls of gap 111. The excess flow port may be used in conjunction with the imaging device 106 and the illumination unit 104 to monitor the flow of material through the extrusion nozzle 100 to ensure that the material is flowing through at a proper rate, as described below. For the purposes of this disclosure, the excess flow port may as a viewing port to determine whether the flow rate is either too high or too low, or both. In other embodiments, the excess flow port may be a hole or other protrusion through the housing 114 or nozzle 100.

Figure 2:
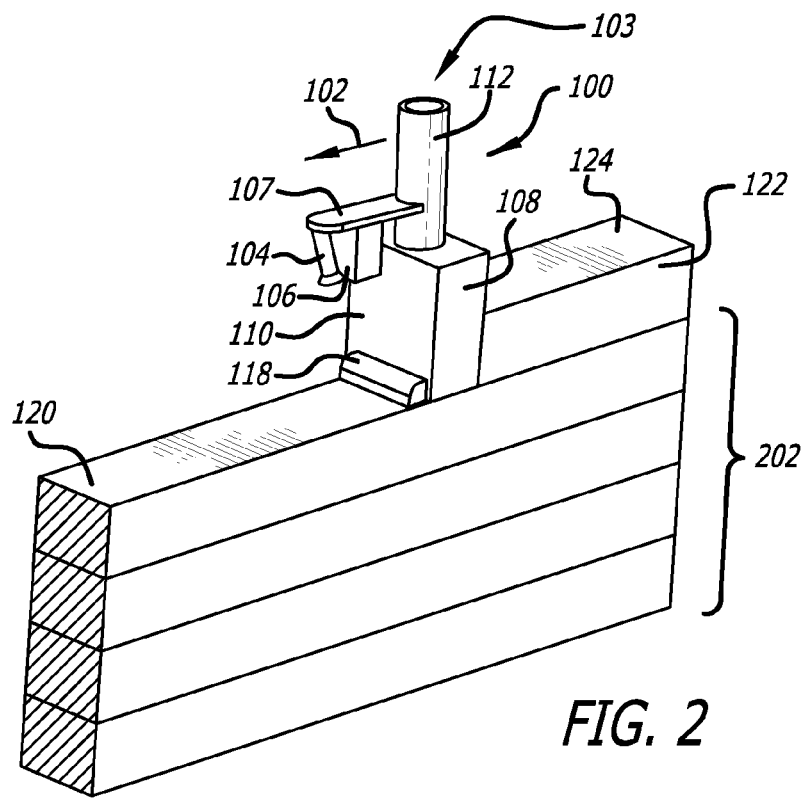
FIG. 2 illustrates the extrusion nozzle assembly of FIG. 1 extruding a layer of material.

FIG. 2 illustrates the extrusion nozzle assembly illustrated in FIG. 1 extruding an extruded layer. As illustrated in FIG. 2, the extrusion nozzle assembly may extrude an extruded layer 122. The extruded layer 122 may be substantially horizontal and may have an upper surface 124 that is also substantially horizontal. The extruded layer 122 may or may not be shaped differently, depending in part on the shape of the outlet 109. The extruded layer 122 may be oriented other than in a horizontal position. In the example shown, the extruded layer 122 is being formed above a plurality of layers 202 that have already been formed by the nozzle assembly.

The extrusion nozzle 100 may move in a horizontal direction on surface 120 along a straight line in the direction indicated by arrow 102. As material enters inlet 103, it is extruded from outlet 108 to form layer 122. If the flow rate of the material through the extrusion nozzle 100 is too fast, then excess material 118 may begin to outlet through the excess flow port. It will be appreciated that if the flow rate is not adjusted in a timely manner, then excess material may be added to layer 122. The excess material may distort the walls, make the layer uneven or cause other defects, anomalies in the construction. Alternatively, a flow rate that is too slow may also be apparent from the excess flow port if, for example, the material passing through the nozzle as viewed through the port is of a lower than required volume.

Imaging device 106 may be affixed on connector arm 107 (or elsewhere on the nozzle assembly) such that it captures a view of part or all of the excess flow port defined by gap 111. Illumination unit 104 may also be fixed to provide illumination of gap 111. The imaging device 106 and the illumination unit 104 may be used to capture the images of the extrusion from above using a sufficiently high frame rate.

The captured images may be used to monitor and control flow rate, which may be needed for a variety of reasons. For example, as the speed of fabrication changes with the nozzle speed being adjusted (for example, as the nozzle navigates round corners), the paste flow rate needs to be adjusted. This change in fabrication speed impacts the amount of excess flow.

The images or video from the imaging device 106 may be provided to a controller which may employ an image processing algorithm. The image processing algorithm may employ an edge detection algorithm for determining an edge associated with a top view (looking down from imaging device 106) of the front portion of excess flow 118. The position of the detected edge is proportional to the amount of the excess flow. Consequently, the flow control mechanism may use the information regarding the excess flow 118 to control and adjust the flow rate on a real time basis. Other types of image processing algorithms may also be used to identify excess flow. In one embodiment described with reference to FIG. 10, the controller may reduce the material flow from a construction material delivery system in order to reduce the flow rate.

The excess flow port is shown as being fixed. In other configurations, one or more server motors, solenoids, pneumatic actuators, hydraulic actuators, or other controlled devices may be used to make the port adjustable. Manually-adjustable mechanisms may be used instead. For example, front wall 110 may be configured to slide up and down to adjust the size of gap 11. In still other implementations, the nozzle assembly may incorporate more than one flow port.

Figure 3A:
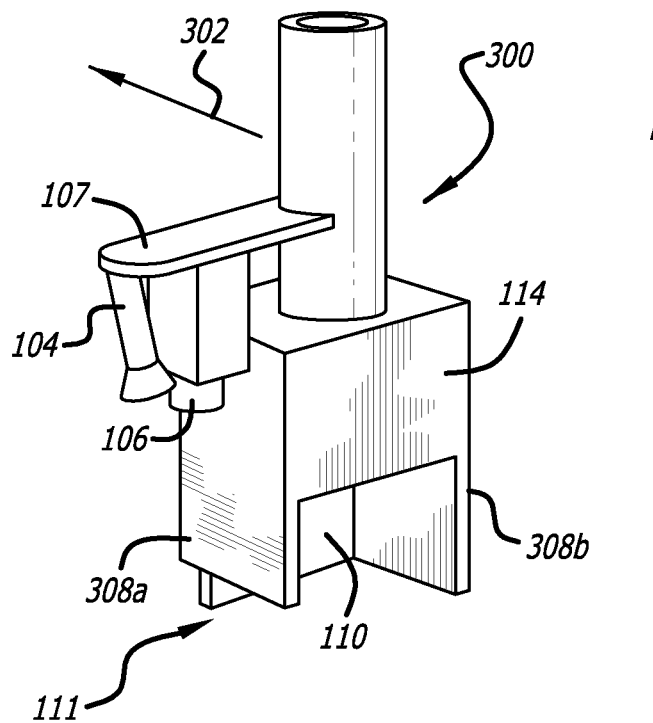
FIG. 3a illustrates a perspective view of an extrusion nozzle assemble configured to detect excess outflow in a direction perpendicular to the direction of nozzle motion.

FIG. 3(a) illustrates an extrusion nozzle assembly 300 configured to extrude a layer of material and to detect excess outflow in a direction perpendicular to the direction of nozzle motion 302. Like in FIG. 1(a), housing unit 115 includes front wall 110, two side walls 308a and 308b, a rear wall 114, connector arm 107, imaging device 106, and illumination unit 104. In this embodiment, the excess flow port defined by gap 111 is in the side wall 308a, bounded by the bottom of side wall 308a and a portion of the side of front wall 110. In contrast to the nozzle assembly of FIG. 1, the connector arm 107 is positioned in FIG. 3a within the nozzle assembly 300 to enable imaging device 106 to capture views of the side wall area, and more specifically gap 111 within side wall 308a.

Figure 3B:
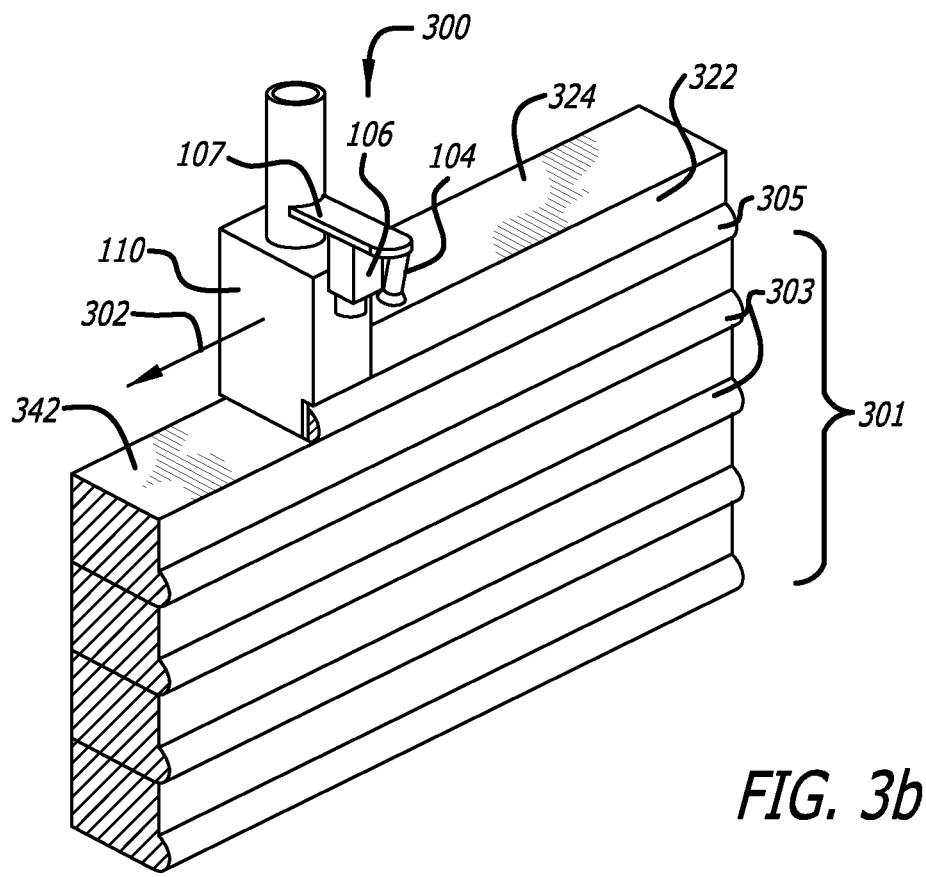
FIG. 3b illustrates the extrusion nozzle assembly of FIG. 3a extruding a layer of material.

In one embodiment shown with reference to FIG. 3B, which illustrates the nozzle assembly of FIG. 3A extruding an extruding layer 322 and moving along direction 302 over horizontal surface 342, only one side of the layered structure is to be smooth. Layers 301 contain ridges 303 which may be formed by the excess flow of material 305 under gap 111. The size of the gap may be controlled by monitoring the flow rate using the imaging device 106 and illumination unit 104 as discussed above. In other embodiments, because only one side of the structure needs to be smooth, the amount of excess flow is not as critical as with respect to FIG. 2 and consequently flow control may not need to be as precise.

Figure 4A:
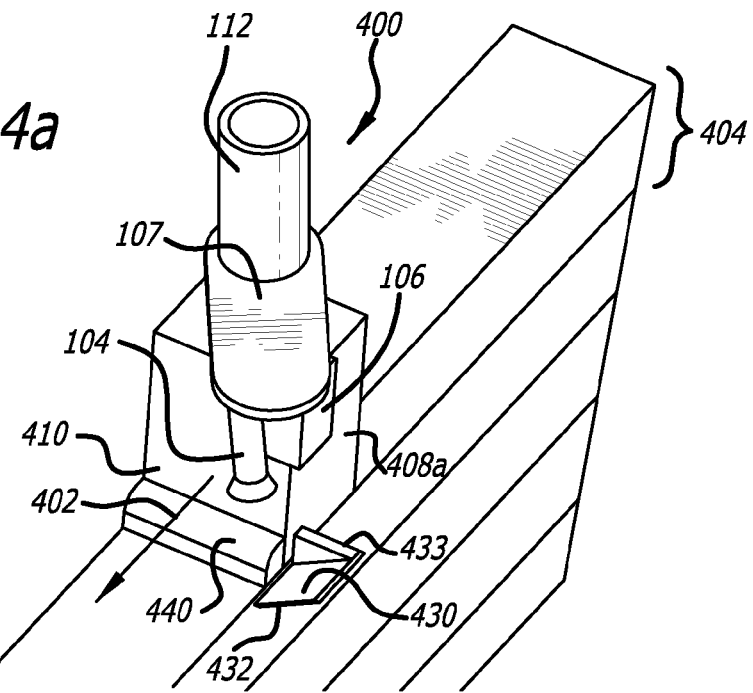
FIG. 4a illustrates an extrusion nozzle assembly enhanced with a mirror and extruding a layer of material.
Figure 4B:
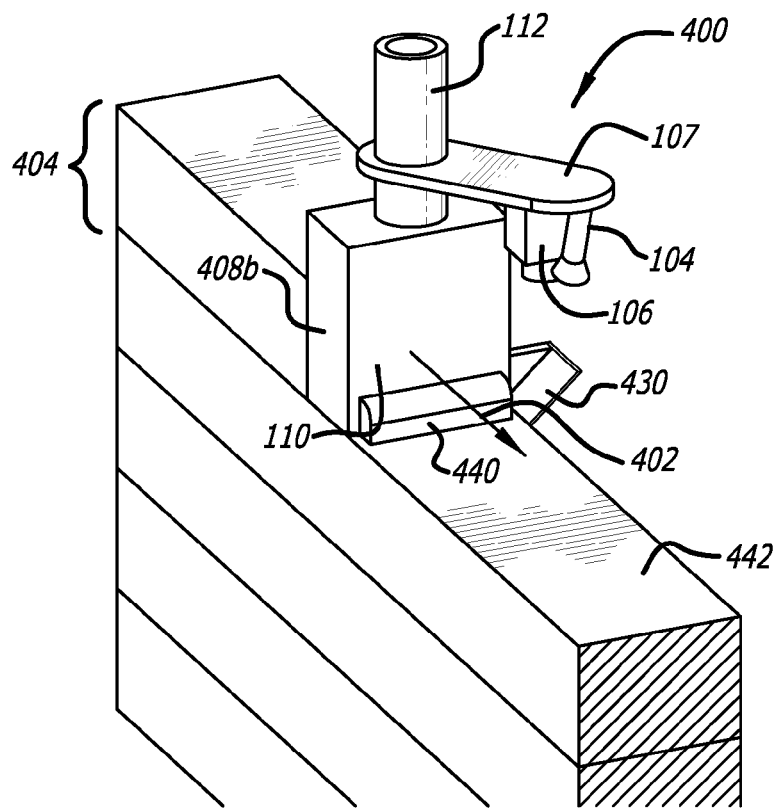

FIG. 4A illustrates a nozzle assembly 400 extruding a layer of material 404. FIG. 4B represents an alternate view of the nozzle 400 of FIG. 4a extruding the layer of material 404 as the nozzle moves along direction 402 over surface 442. The nozzle assembly 400 is similar to assembly shown in FIG. 1 in that the excess outflow port is positioned at the bottom of front wall 410 such that excess material 440 may extrude through the port in the direction 402 of movement of the nozzle. In this embodiment, the visual information captured by imaging device 106 may be enhanced by the addition of mirror 432 adjacent a side wall 408a. The mirror 432 is positioned at an angle of 45 degrees relative to the excess material 440. Other angles may be used. Mirror 432 includes a reflective base 430 and a side piece 433.

The connector arm 107 in FIGS. 4A and 4B may be rotated slightly counter-clockwise relative to the same element in FIG. 1 to enable the imaging device 106 to capture images using the mirror 430. The connector arm may be controlled by a controller, actuator, and/or nozzle positioning system to rotate back and forth as required to enable the imaging device 106 to capture the top as well as the side view of the excess extrusion. In one embodiment, using a combination of the connector arm, the lens focusing or angle adjustment as performed manually or by a controller or actuator (such as controller 917 of FIG. 9), or another suitable mechanical technique as known in the art, the camera may be configured to capture both top and side views in a single frame. The image processing system in controller 917 can, upon receiving the frame, separate the two images. The added views can provide for a better estimate of the volume and nature of the excess extrusion. In another embodiment, a second imaging device may be used in place of the mirror 432.

Figure 5A:
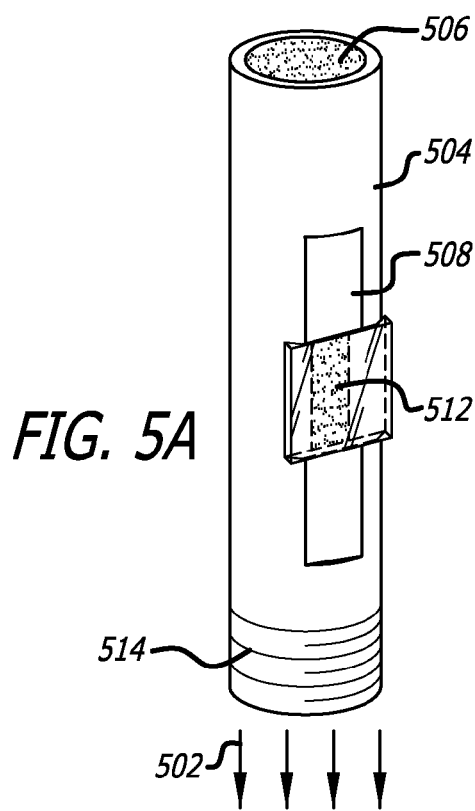
FIG. 5A illustrates a channeling element configured with a window to enable visual inspection of the flow of material.

In other aspects, flow rate measurements or determinations of excess or insufficient flow may be made by visually sensing excess flow via a window opened in a channeling element leading to the extrusion nozzle. This technique requires the material to contain components or particles that are visually distinguishable. Such visually distinguishable particles may include, for example, sand in concrete. FIG. 5A illustrates a channeling element 504 for flowing material. The material flows in through inlet 506 and out through outlet 502. Channeling element 504 may be constructed at any suitable fixed point in the material flow. Channeling element 504 may be coupled either directly, or indirectly as a part of an larger transport channel, from a source of the material flow (such as the construction material delivery system 907 of FIG. 9) to an extrusion nozzle (such as extrusion nozzle 100 of FIG. 1). Channeling element may include a more complex channeling mechanism, for example, or a simple tube or other physical conduit. The conduit may be constructed of metal, a polymer, or another material. In a preferred embodiment, the substrate for detecting material flow is located as close as practicable to the extrusion nozzle because flow rate measurements closer to the extrusion nozzle tend to more accurately reflect the flow rate out of the extrusion nozzle. For example, in some embodiments, channeling element portion 504 may be part of the nozzle assembly and may, for instance, coupled to tube 112 of nozzle 100 (FIG. 1) using the treads 514.

In FIG. 5A, a window 508 is opened into the channeling element 504. The opening includes a clear substrate 512 which may be scratch resistant for applications in which the material includes abrasive aggregates such as concrete. As the material flows through the passage, the material and its speed may be sensed by an imaging device and an image processing algorithm. For certain speed ranges, such algorithms and related optical hardware are already available inexpensively in computer optical mice. For higher speeds, dedicated cameras, electronics, and image and signal processing algorithms may be used to measure the flow speed.

For more accurate flow measurements, multiple windows may be installed at various points around the channeling element, and the sensor data received by the controller may be averaged.

Figure 5B:
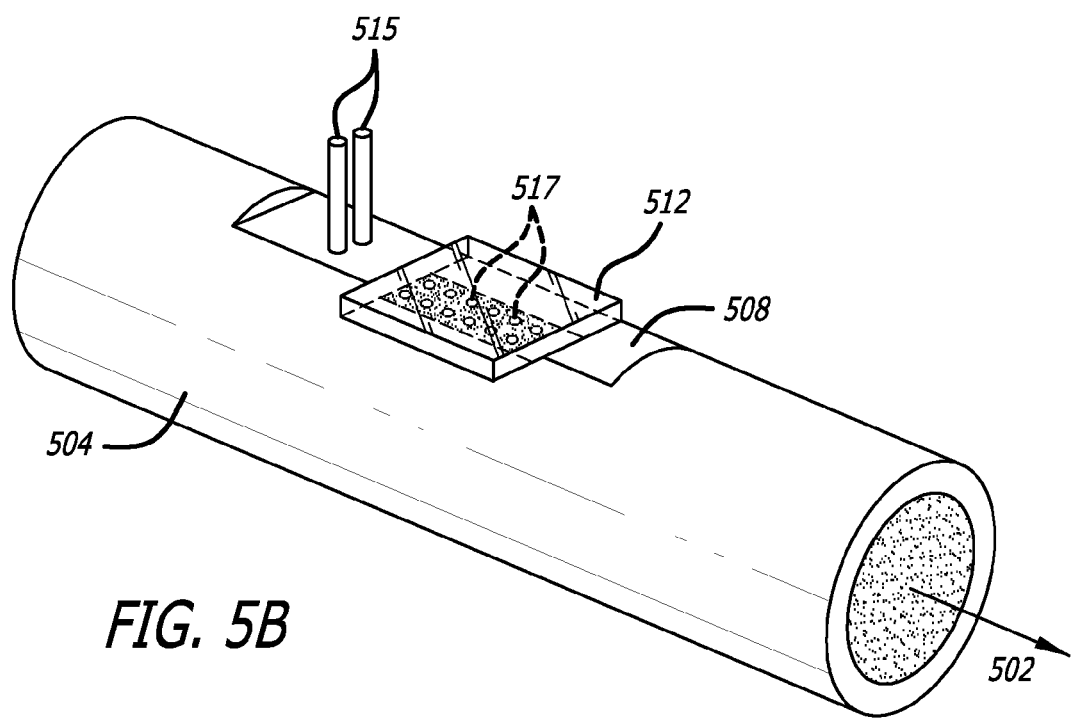
FIG. 5B illustrates a channeling element configured with an air inlet to enable visual inspection of air bubbles in the channel to determine flow rate.

To make the method applicable to homogenous materials with no aggregate particles, a section of the channeling element may preferably be held in a horizontal position and air bubbles or small amounts of fluid with distinguishable color and lighter density than the base fluid may be dosed to the top of the visual window by a pulsating dosing mechanism. The passage of material can then be optically sensed by detecting the air bubbles or the dosed colored material. FIG. 5B shows this arrangement. Material or viscous fluid flows through channeling element 504 and outlet 502 as before. Tubes 515 supply pulsating air bubbles 517 or a dosed colored substance through an orifice in the illustrated segment of channeling element 504 to the material in the channeling element 504. The air bubbles or colored substance may be optically sensed through the substrate 512. The location 515 where air bubbles are injected into the segment is upstream of the substrate 512 such that the air bubbles can be viewed within the material flow through the substrate 512 by a corresponding imaging device. The imaging device can thereupon estimate the material flow rate by estimating the flow rate of the visible air bubbles as shown in the images (which can include still images or video). Thereupon, as before, the imaging device can adjust the flow rate upwards or downwards as necessary.

This configuration may also be applicable to non-viscous fluids as well, in which case the channeling element must be held in horizontal position for the air bubbles to remain on top and move against the visual window.

Figure 6:
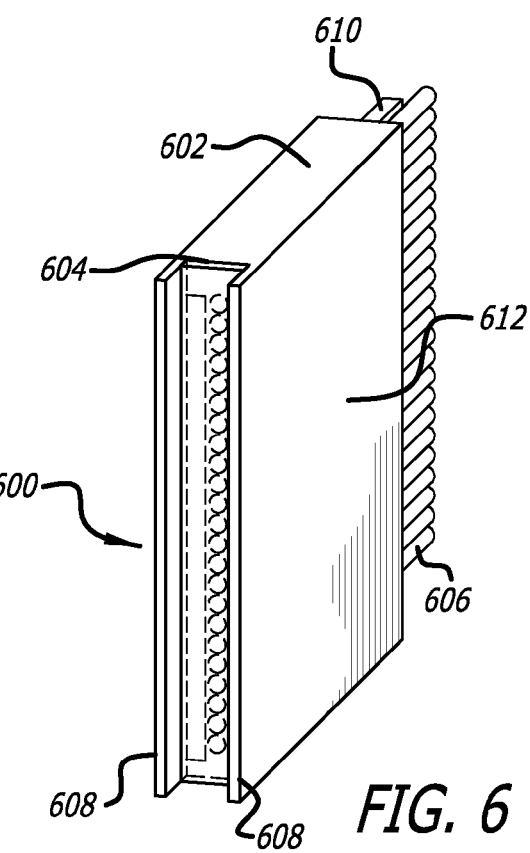
FIG. 6 illustrates a fiber optic sensor configured to sense the flow of material using optical fibers.

In another aspect, a fiber optic-based sensor is used to sense the flow of material. This aspect may be useful when, for example, the flow of material in the core on the channeling element is different from the material flow on the sides. FIG. 6 illustrates a fiber optic sensor 600 configured to transmit the image of the flow of material using optical fibers 606 to an electronic image sensing device. The sensor 600 includes side walls 612 (one shown), top wall 602, a single array column of optical fibers 606, a light conduit for illumination (such as a clear acrylic sheet) 610 and casing edges 608 and 604. The detection of material flow in this embodiment may be made by an electronic sensor (not shown) such as a single CCD array, detector diode array, or the like.

Figure 7:
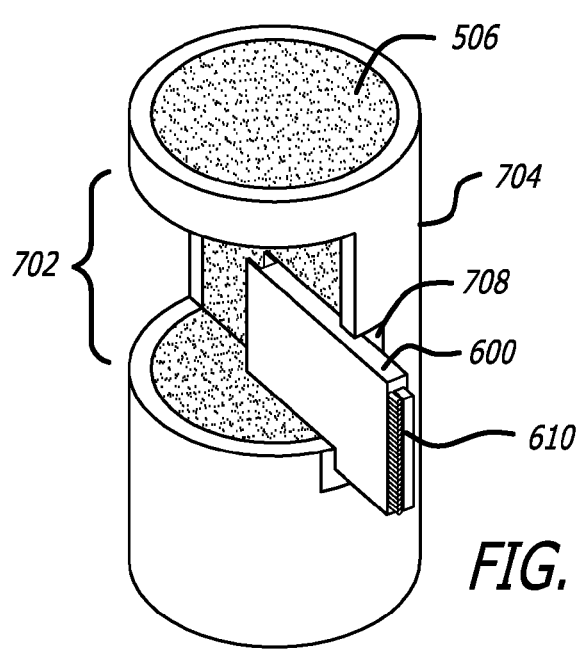
FIG. 7 illustrates the fiber optic sensor of FIG. 6 in a channeling element.

FIG. 7 shows a cross section 702 of channeling element 704 incorporating the sensor 600. The sensor is disposed on the surface of channeling element 704 through an opening 708 constructed in channeling element 704, with a portion of the channeling element cut off for clarity. The edges 608 and 604 are facing into the channeling element 704, toward the material inside channeling element 704. The light directing panel 610 (e.g., an acrylic sheet) may direct the illumination light in the material to the visible surface of the material. A guiding element composed of edges 608 and 604 of the casing may direct the material to pass in front of the optical fibers 606 in a straight line so that optically distinguishable particles cross all fiber tips for detection by the imaging device, which may be processed via a movement tracking algorithm in the controller.

Figure 8:
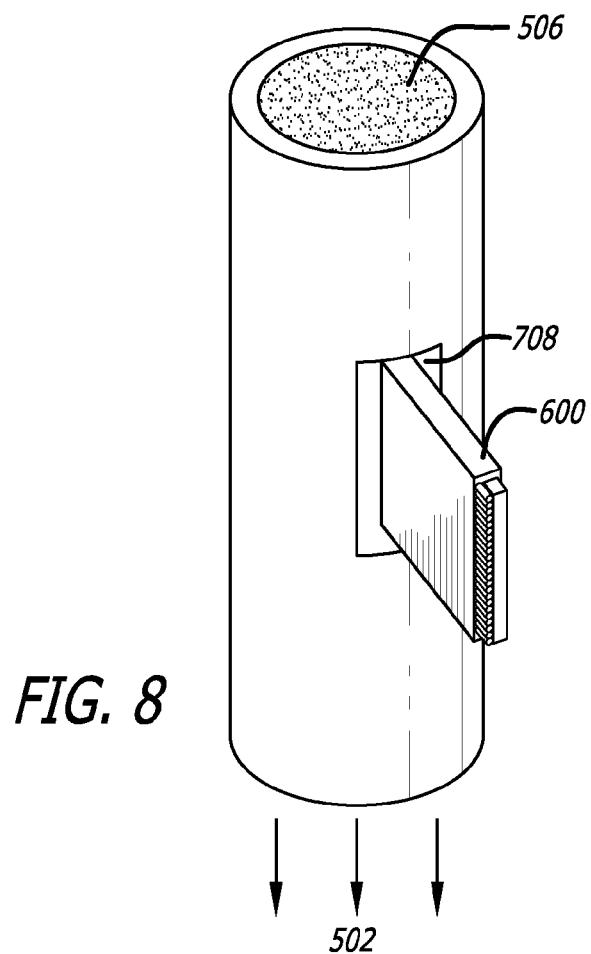
FIG. 8 illustrates another view of the fiber optic sensor of FIG. 6 in a channeling element.

FIG. 8 shows a view of the sensor 600 through the channeling element without the cut-out. Opening 708 is constructed to allow the sensor 600 to be inserted into the channel. Material flows through inlet 506 and out of outlet 502.

Figure 9:
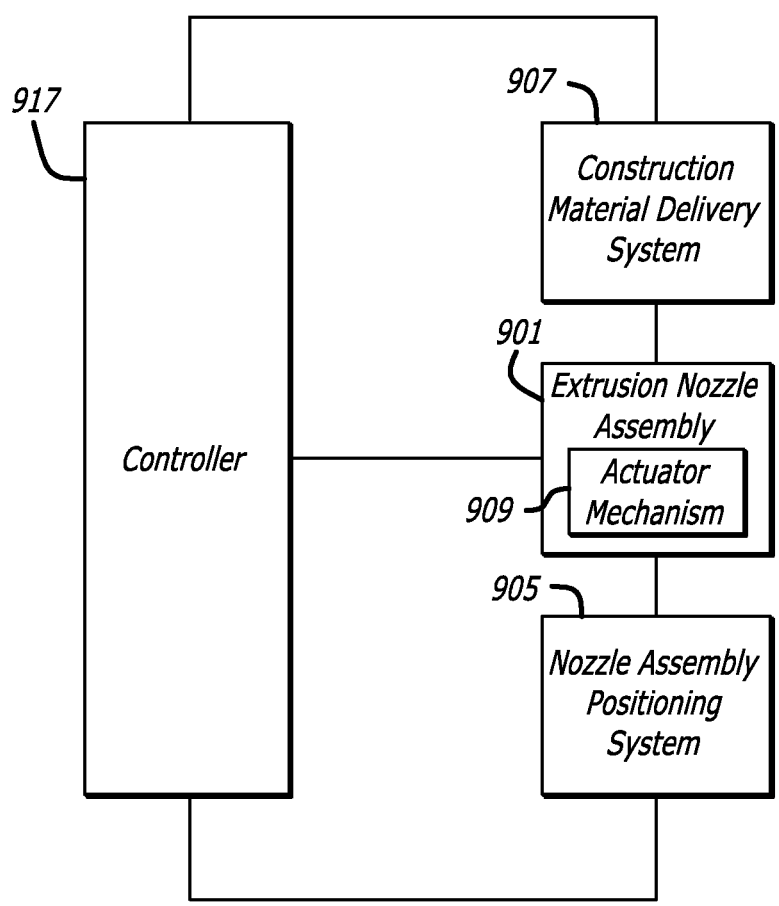
FIG. 9 illustrates a block diagram of an automated extrusion construction system.

FIG. 9 is a block diagram of an automated extrusion construction system. This automated extrusion construction system may be used in connection with any one or more of the extrusion nozzles assemblies discussed above. Conversely, the extrusion nozzle assemblies that have been discussed above may be used in connection with any other type of automated extrusion construction system, with any manual type of extrusion construction system, and/or by a construction system that is partially automatic and partially manual.

The automated extruded construction system may include one or more extrusion nozzle assemblies, such as an extrusion nozzle assembly 901. The automated extrusion construction system may include one or more independent extrusion nozzles (e.g., having no excess flow and imaging mechanisms). It may instead have no independent extrusion nozzles.

Each of the nozzles of the extrusion nozzle assembly 901 may be configured to move from an extrusion position to a non-extrusion position using one or more actuator mechanisms 909. Any type of device may be used for the actuator mechanism, such as a server motor, solenoid, pneumatic actuator, hydraulic actuator, and/or any combination of these. The extrusion nozzle assembly 901 may be moved to different positions by a nozzle assembly positioning system 905. The nozzle assembly positioning system 905 may be configured to controllably move the extrusion nozzle assembly 901 to any position within three dimensional space. The nozzle assembly positioning system 905 may be configured to control the orientation of the outlet or outlets from the extrusion nozzle assembly 901, as well as their position in space. To accomplish this, the nozzle assembly positioning system 905 may include one or more robotic systems, such as one or more systems that have been described in one or more of the patent and patent applications identified above. The nozzle assembly positioning system 905 may utilize one or more servo motors, solenoids, nomadic actuators, hydraulic actuators, gantry positioning systems, and/or any combination of these.

Construction material of any of the types described above may be delivered to the extrusion nozzle assembly 901 by a construction material delivery system 907. The construction material delivery system 907 may include one or more construction material storage tanks, one or more pumps, one or more pressure and/or flow regulators, one or more mixers, or any combination of these. The construction material delivery system may also include one or more passage flows, such as channel element 504 of FIG. 5A.

A controller 917 may be configured to automate the control of the nozzle assembly positioning system 905, the construction material delivery system 907, and the actuator mechanisms 909. For example, the controller 917 may be configured to cause all of these components to function in an orchestrated manner so as to extrude a structure, such as a home or office building, layer by layer.

The controller 917 may also receive images of the excess flow port from the extrusion nozzle assembly 901, process those images (e.g., using the edge detection algorithm referenced herein or another suitable technique), and may respond, where necessary, by adjusting parameters to the construction material delivery system 907 (e.g., to reduce or increase flow rate). Alternatively, the controller 917 may cause nozzle assembly positioning system 905 to adjust the extrusion nozzle assembly 901 based on feedback received from the images obtained from the extrusion nozzle assembly 901. The controller may use one or more algorithms to adjust material flow fate through an extrusion nozzle in extrusion nozzle assembly 901 based on one or more images of the excess flow port received from the extrusion nozzle.

The controller 917 may be of any type. The controller 917 may include one or more computer systems, including one or more processing systems, movement sensing systems, memories, hard disks, uses of interfaces, network systems, and computer programs. The controller 917 may be programmed to construct an entire building or a substantial portions of it in a completely automated fashion, with minimal or no user intervention.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

For example, the nozzles that build external and internal extruded surfaces may deposit succeeding surface layers, one surface on the face of the other, in multiple passes. These could be of the same or different material. For example, an insulation material may be extruded onto the internal surface during a first pass and plaster may be extruded over the insulation material during a second pass.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

I claim:

1. An extrusion construction system comprising:
   an extrusion nozzle configured to extrude a bead of construction material onto an external surface as the extrusion nozzle traverses the external surface;
   an imaging device configured to capture images of excess construction material which flows out of the extrusion nozzle; and
   a controller configured to make adjustments to the rate at which the extrusion nozzle extrudes the bead of construction material based on the images so as to cause the flow of the excess construction material to be substantially constant during the traversing,
   wherein the extrusion nozzle includes a tube having a substantially rectangular cross-section formed by a fixed first, second, third, and fourth wall, wherein the end of the tube is formed by an ending edge of each wall and wherein the ending edges of the first and the second walls lie in a first plane, the ending edge of the third wall lies in a second plane that is substantially different than the first plane, and the ending edge of the fourth wall lies in a third plane that is substantially different than the first and the second planes, and wherein the walls of the nozzle form an opening through which the excess construction material flows.

2. The extrusion construction system of claim 1 further comprising an illumination unit configured to illuminate the excess construction material.

3. The extrusion construction system of claim 1 further comprising a connector coupled to the extrusion nozzle and to the imaging device, the connector being configured to maintain a position of the imaging device to enable the one or more images to be captured.

4. The extrusion construction system of claim 3 wherein the connector is configured to be rotated around an axis parallel to a plane of the extrusion nozzle.

5. The extrusion construction system of claim 1 further comprising a mirror and wherein the captured images are of reflections from the mirror.

6. The extrusion construction system of claim 1 wherein the adjustments include adjusting the flow rate automatically in real time using an image processing algorithm.

7. The extrusion construction system of claim 1 wherein the extrusion nozzle is configured to extrude construction material comprising a plurality of substantially stacked and substantially horizontal layers.

8. The extrusion construction system of claim 1 wherein the imaging device comprises a digital camera.

9. The extrusion construction system of claim 1 wherein the first and the second walls are substantially parallel to one another.

10. The extrusion construction system of claim 1 wherein the first and the second walls are substantially perpendicular to one another.

11. The extrusion construction system of claim 10 wherein the first and second walls are longer than the third and fourth walls.

12. The extrusion construction system of claim 9 wherein the first and second walls are longer than the third and fourth walls.

13. The extrusion construction system of claim 9 wherein the first and second walls are longer than the third and fourth walls.

14. An extrusion construction system comprising: an extrusion nozzle configured to extrude a bead of construction material onto an external surface as the extrusion nozzle traverses the external surface; an imaging device configured to capture images of excess construction material which flows out of the extrusion nozzle in a direction that is in front of or to the side of the extrusion nozzle as it traverses the external surface with respect to its direction of traverse; and a controller configured to make adjustments to the rate at which the extrusion nozzle extrudes the bead of construction material based on the images, wherein the extrusion nozzle includes a tube having a substantially rectangular cross-section formed by a fixed first, second, third, and fourth wall, wherein the end of the tube is formed by an ending edge of each wall and wherein the ending edges of the first and the second walls lie in a first plane, the ending edge of the third wall lies in a second plane that is substantially different than the first plane, and the ending edge of the fourth wall lies in a third plane that is substantially different than the first and second planes, and wherein the walls of the nozzle form an opening through which the excess construction material flows.

15. The extrusion construction system of claim 14 wherein the imaging device is configured to capture images of excess construction material which flows out of the extrusion nozzle in a direction that is in front of the extrusion nozzle as it traverses the external surface.

16. The extrusion construction system of claim 14 wherein the imaging device is configured to capture images of excess construction material which flows out of the extrusion nozzle in a direction that is to the side of the extrusion nozzle as it traverses the external surface.

* * * * *